United States Patent Office 2,927,033
Patented Mar. 1, 1960

2,927,033
HYDRAULIC CEMENT COMPOSITIONS

Stephen W. Benedict, Cleveland Heights, and Thomas M. Kelly, Chagrin Falls, Ohio, assignors to American-Marietta Company, Chicago, Ill., a corporation of Illinois No Drawing. Application June 4, 1957
Serial No. 663,356

13 Claims. (Cl. 106—90)

This invention relates to additive compositions for incorporation in hydraulic cement mixes, for example, Portland cement concretes and mortars and dry mixes for making such concretes and mortars, and to the resultant hydraulic cement mixes containing the additive compositions.

The invention relates more particularly to additives for hydraulic cement mixes and to the resulting cement mixes having characteristics desired for use in the construction of highways, airport runways, and other large paved areas, where high compressive and flexural strengths, resistance to freezing and thawing conditions and to scaling when de-iced with soluble salts, and minimum volume change, both during and after setting, are especially desired.

The principal objects of the invention are to provide additives for Portland cement concrete and mortar mixes which will increase the strength of the hardened mixes for a given cement content while, at the same time, imparting increased resistance to freezing and thawing and to de-icing with soluble salts by incorporating a relatively large amount of entrained air in the cement mixes. Further objects of the invention are to provide additives which will produce the foregoing advantageous results without impairment of the working properties of the cement mixes, their rate of hardening, and their general suitability for a wide variety of structural uses. A more specific object of the invention is to provide high air entrainment in cement mixes along with very high strengths, while using normal cement factors, so as to combine the properties of high strength and maximum durability required for highways, airport runways, and the like.

The foregoing and still other objects and advantages of the invention will be better appreciated by first reviewing some of the prior developments in the cement additive art.

For many years, a great deal of research has been conducted to find suitable additives for modifying and improving the characteristics of hydraulic cement mixes to meet the widely varying technical and economic needs of the construction industries, and much has been accomplished in that direction. Today, a large percentage of the concrete used in the construction industries, including commercial, ready-mixed concrete sold to the trade and public at large, contains one or more additives for the purpose of obtaining the desired physical properties and, at the same time, keeping the amount of cement in the mixes to a minimum.

Other factors being equal, increases in final strength are obtainable, within limits, by increasing the amount of cement in a mix. Where plain hydraulic cement concretes and mortars made with moderate or low cement factors meet all requirements as to physical properties, the objective has been to find ways to reduce costs by reducing the amount of cement in the mixes while still meeting these requirements. Where the requirements as to physical properties exceed or differ from the results obtainable with plain mixes containing moderate amounts of cement, the objective has been to meet those requirements while keeping the amount of cement required to a minimum.

In some classes of construction work, keeping the amount of cement to a minimum is primarily a matter of economy. In other classes of work, however, such as highway and airport runway construction, for example, strength and durability requirements are so severe, and so much more important than the cost of the cement, that the optimum amount of cement from the standpoint of strength and durability is generally used regardless of cost. Here the problem becomes one of compromising between maximum strength and maximum durability. This is because increasing the amount of cement beyond about 6 sacks per yard of concrete may effect further increases in strength but begins to have seriously adverse effects on durability by causing excessive volume changes, followed by shrinkage, cracking and ultimate disintegration. Also, high cement factors render the placement of concrete more difficult, particularly during hot weather. Thus, particularly for work in the last-mentioned class, durability and ease of placement of the concrete impose rather definite upper limits on the cement factor, and the most vital technical problem in the art is to obtain still greater strength without loss of durability. Thus, in nearly all cases, a prime consideration has been to achieve the desired technical results with a minimum amount of cement, however modest or severe the technical requirements may be.

By the use of so-called "plasticizing agents" or "water-reducers," the final strength can be increased without increasing the amount of cement, or, what is the same thing, a given strength can be achieved with less cement. Hence, such agents have come into wide use wherever strength has become a sufficiently important consideration to affect the amount of cement employed in a plain mix. Waste sulfite liquors or the solids contained therein, with or without various additives, have been widely used in the industry as water-reducers for many years. The principal active ingredient of waste sulfite liquors or the solids of these liquors is lignosulfonic acid or a salt thereof. No more generally satisfactory agents for this purpose have yet been found.

One of the drawbacks in the use of water-reducers (including waste sulfite liquors and their derivatives) has been their retarding effect on the rate of setting and hardening of a cement mix and on its rate of gain in compressive strength during the hardening process. Slow setting delays surface finishing of floor slabs and the like and complicates production schedules. Slow hardening delays the time when forms can be removed from concrete structures and loads can be imposed thereon in the course of further construction. These retarding effects are particularly pronounced when working at low temperatures, which is frequently necessary in order to maintain construction schedules in highway building programs and the like.

The retarding effect of water-reducers on the hardening of a hydraulic cement mix may be counteracted, within limits, by the use of substantial amounts of a chloride accelerator, such as calcium chloride. Though not an entirely satisfactory solution for this problem in many types of construction work, the use of a chloride accelerator in conjunction with a water-reducer has become common practice for obtaining the beneficial effects of the water-reducer without too seriously retarding the rate of hardening. Such use of a chloride accelerator, however, contributes nothing to the final strength of the hardened cement mix.

Various other additive agents for hydraulic cement mixes have also been used, both alone and in conjunction with a water-reducer and calcium chloride, to achieve results of a similar character or to modify other properties of the hydraulic cement mixes, as required by particular construction needs. However, the effects of combining various additives having similar or complementary properties have generally not bee the sum of their individual effects, as might have been expected, and have often been surprisingly and unpredictably greater than this sum, in some instances, and less in others.

The chemical and physical effects of the agents employed as cement additives, individually and in combination, have been observable and measurable, but have rarely been explainable, and are presently the subject of many conflicting theories. This is due in part, no doubt, to the fact that the hydraulic setting of cements, itself, is a phenomenon that is still not fully or clearly understood. Additives which are beneficial in certain respects, when used in small amounts, are often seriously and unpredictably detrimental, when used in larger amounts, by reason of introducing to a more pronounced degree, various undesired effects that more than counterbalance the desired action of the larger amounts. Similarly, the normally slight and unnoticeable side effects of various agents, when used individually, may be either additive or subtractive, when such agents are combined, so as to introduce wholly unpredictable consequences. This may occur whether the individual effects of the combined agents are the same or entirely different in character.

The foregoing facts are illustrated by the present invention, according to which four known types of hydraulic cement additives are combined in a narrow range of proportions with surprising and unpredictable results. These four additives are:

*Component 1.*—Solids of waste sulfite liquor, with or without separation of a portion or all of the carbohydrates, the principal active ingredient being lignosulfonic acid or a salt thereof.

*Component 2.*—Water-soluble chloride accelerators, such as the various water-soluble metal chlorides and ammonium chloride.

*Component 3.*—Water-soluble condensation products of formaldehyde or a higher aldehyde and aromatic sulfonic acids (preferably sulfonic acids of naphthalene and substituted naphthalenes), and the water-soluble salts of such condensation products.

*Component 4.*—Water-soluble, alkyl (including alkylol) amines.

When these four components are combined in proper proportions in hydraulic cement concrete mixes, abnormally high contents of entrained air are produced, generally ranging above 6% by volume, without inclusion of an additional air entraining agent, compared to from around 1 to 2% in a plain mix containing no additives. It is well recognized that, other factors remaining unchanged, increases in entrained air cause decreases in strength while having the beneficial effect of increasing the resistance of the hardened concrete to freezing and thawing and to the scaling effects of salts used for deicing. Where the cement factor is above about 5 sacks per yard of concrete, the loss of strength is about 5% for each 1% of entrained air above the normal 1% to 2% in a plain mix. As a result, where high strengths have been required, it has been thought that the amount of entrained air should be limited to a maximum of 5% or less, even though higher air contents would be preferred but for greatly increasing the amount of cement required to maintain the required strength. This problem has been intensified recently by demands for greater durability and resistance to scaling, and by published research of the United States Bureau of Public Roads indicating that entrained air contents up to 7% or even 8% would be desirable for this purpose if adequate strength could also be obtained without impairing durability due to the use of excessively high cement factors.

While it is a simple matter to produce the high air contents desired for concrete highway construction, for example, by the use of air-entraining agents in combination with conventional water-reducers and accelerators, this has heretofore caused excessive losses in strength. Such losses can be counteracted up to a point, while retaining high air contents, by the use of higher cement factors, but the increased costs of the required greater quantities of cement and/or the adverse effects on durability have made this remedy inadequate.

The combination of the four components of the present invention produces the desired high entrained air contents for maximum durability and resistance to scaling, but it does so without any sacrifice in strength compared to the best results heretofore obtainable with the same amounts of cement and much lower air contents. Compared to plain mixes (containing no additives) and using the same basic mix ingredients, cement factors, and slumps, mixes containing the four additive components of the present invention have consistently produced final compressive strength increases of about 30% to 40% while increasing the air contents from a range of 1.4% to 1.6% for the plain mixes to from 6.0% to 7.4% for the mixes containing our four additive components. At the same time, unusually good one-day and seven-day strengths were also obtained, finishing times were comparable to those for the plain mixes, and the workability of the mixes was excellent. In addition, the total amount of all four additives used and the cost of the ingredients was not significantly different from the corresponding figures for prior art additives capable of producing comparable early and final strengths but with substantially lower air contents.

Where still greater air contents are desired, we have been able to produce them, up to as high as 10% by volume, while still obtaining greater final strength than with plain mixes using the same amount of cement and containing only about 1.6% air. This requires somewhat greater amounts of the four-component additive and reduces strengths up to about 7 days, but is entirely satisfactory where early strength is not important.

These results, obtained by means of the present invention, exceed anything heretofore attainable, to the best of our knowledge, and are especially suitable for meeting the long-felt needs encountered in the construction of highways and airport runways, as well as in various other concrete construction fields.

The broad class of waste sulfite liquor solids which may constitute Component 1 of the additive combination of the invention constitutes a long-recognized class of water-reducers for hydraulic cement mixes. The waste sulfite liquors of commerce are generally available only in a neutralized form, having been neutralized to convert the acids therein to salts. The usual neutralizers are: calcium, magnesium, ammonium, and sodium, calcium being the most common. The waste sulfite liquor solids referred to herein may be derived from either the neutralized or unneutralized liquor and may consist primarily of only lignosulfonic acid or a salt thereof, or they may include some or all of the various other solids in the liquors. Use of the solids of neutralized liquors is preferred for the purposes of the present invention. However, the same kind of improvement results whether or not the waste sulfite liquor employed has first been neutralized, and whether the whole liquor or only the solids are used, though the results will differ in degree of effectiveness.

It is desirable that a substantial portion of the carbohydrates be removed from the waste sulfite liquor or from the solids thereof which are to be used in cement mixes. This may be accomplished by removing the fermentable sugars from the liquor before its use in cement, or before recovering the remaining solids for use in cement, for example, as disclosed in U.S. Patent 2,435,594 to MacPherson, though other purification procedures to remove a portion of the carbohydrates may be employed.

Also, for example, the lignosulfonic acid component may be separated from the liquor and used alone as a soluble salt, as disclosed in U.S. Patent 2,141,570 to Mark.

The waste sulfite liquor from which the solids are derived may also be treated with an ion exchange resin, preferably an anion exchanger, although a cation exchanger may be used. This treatment is described in the copending application of Edward W. Scripture, Jr. and Stephen W. Benedict, Serial No. 475,292, filed December 14, 1954, now U.S. Patent No. 2,872,329, issued February 3, 1959. Alternatively, or in addition, the waste sulfite liquor may be treated with activated carbon. The activated carbon treatment is the subject of the co-pending application of Edward W. Scripture, Jr., Stephen W. Benedict, and Paul B. Jacox, Serial No. 543,024, filed October 26, 1955, now U.S. Patent No. 2,868,659, issued January 13, 1959. These treatments also serve to remove certain components or ingredients of the liquors, such as certain of the carbohydrates, which appear to impair the properties of concrete or to detract from the beneficial effects of the lignosulfonic component of the liquors.

The chloride accelerators constituting Component 2 of the additive combination of the invention constitute a well known class of compounds useful as accelerators in hydraulic cement mixes. Included are the alkali and alkaline earth metal chlorides and ammonium chloride. Of these, calcium chloride has been most widely used in the hydraulic cement field and is most suitable for use in accordance with the present invention from the standpoint of convenience and availability and cost of the compound used. For convenience herein, the compounds of this class are all referred to as "chloride accelerators."

The first two of the above four types of cement additives (i.e., waste sulfite liquor solids and chloride accelerators) have long been used in combination as pointed out above, with generally predictable improvements in strength and plasticity, but with more or less retardation of set, depending upon the relative and total amounts of these two agents used in a mix.

The third of these four types of components was disclosed as a cement dispersing and plasticizing agent (water-reducer) and as a contributor to the final strength imparted to a mix by a given quantity of cement, in U.S. Patent No. 2,141,569 to George R. Tucker. These aldehyde-aromatic sulfonic acid condensation products and derivatives disclosed by Tucker were promptly displaced (for the purposes for which Tucker disclosed them) by waste sulfite liquor and its derivatives (first of the above four components), which were found to have similar properties in cement mixes, but to a more pronounced degree. Thus, until recently, such condensation products found little or no commercial use as hydraulic cement additives.

In U.S. Patent No. 2,690,975 of Edward W. Scripture, Jr., combinations of waste sulfite liquor derivatives and Tucker's condensation products, within restricted quantity ranges, were disclosed as producing a somewhat greater than expected final strength with a somewhat accelerated, rather than a retarded rate of set, even when employing no chloride accelerator. This surprising result was obtained with a small total quantity of the two additives, about equal to the amount of waste sulfite liquor, alone, previously required to produce a smaller gain in final strength with the disadvantage of substantial retardation of set. However, as expressly pointed out in this Scripture patent, the use of larger amounts of the two types of water-reducers (specifically 0.20% waste sulfite liquor derivative and 0.25% of Tucker's or Scripture's condensation product or 0.25% of the former and 0.20% of the latter), caused the entrainment of an excessive amount of air and, presumably for this reason, produced a relatively weak concrete and no acceleration of set.

To achieve the objectives of the present invention to the optimum degree, we find it desirable to use somewhat greater amounts of the same two water-reducers (waste sulfite liquor derivative and Tucker's or Scripture's condensation product) than those recommended by Scripture, and generally, and preferably combined amounts which were found by Scripture to be excessive and deleterious. In order to achieve our improved results with such a combination, we also use a conventional chloride accelerator, generally in a smaller than normal amount, and a very small quantity of our fourth component, namely, one of the class of amine compounds designated as the fourth component in the above list.

Various amine compounds, including some of those useful in accordance with the present invention, have also been used to some extent in hydraulic cement mixes prior to this invention. For the purposes of the present invention, the class of useful amines may be defined as the water-soluble alkyl amines. Examples of suitable amine compounds are the mono-, di-, and triethanolamines; tri-isopropylamine; 2-amino, 1-butanolamine; n-methyl glucamine; mono-, di-, and triethyl amines; 1-amino, 2-methyl, 1-propanolamine; and the like, the primary, secondary, tertiary, and quaternary alkyl and alkylol amines being particularly suitable, and triethanolamine being preferred from the standpoint of availability and cost. The commercial grades of these compounds are usually satisfactory, and they may be used separately or in combination. For convenience herein, the compounds of this class are all referred to as "water-soluble amines."

Useful ranges for the amounts by weight of the four additive components of the invention (designated by the same numbers as above), based on the weight of hydraulic cement in a mix, are as follows:

TABLE I

|  | Percent by weight |
|---|---|
| Component 1 | .20 to .50 |
| Component 2 | .02 to .30 |
| Component 3 | .15 to .30 |
| Component 4 | .03 to .20 |
| Totals | .40 to 1.30 |

In the above table, and throughout the remainder of this specification and in the appended claims, the specified amounts of chloride accelerator (Component 2) are the amounts which are suitable for use to counteract the retarding effects of the waste sulfite liquor solids, in the particular four-component admixture of the invention, when placing concrete at temperatures which are not unduly low. When placing concrete in sub-freezing weather, which causes abnormal retardation of the setting of cement, much larger quantities of chloride accelerator have commonly been used, in extreme cases up to as high as 3 or 4% by weight of the hydraulic cement. It is to be understood that the present invention does not preclude the use of much larger quantities of chloride accelerator for such special or unusual situations. In such cases the additional amount of accelerator that may be used is considered as a supplementary, special purpose additive, separate and distinct from the combination on which the present invention is based. As in the case of other supplementary, special purpose additives, which may be used in conjunction with the present invention, as explained hereinafter, the use of larger amounts of accelerator does not, in any sense, constitute a departure from the invention described and claimed herein.

In this connection, it should also be mentioned that the vital or active element in the water-soluble chloride accelerators is the chlorine radical. Thus, the amounts of the many different soluble chlorides that may be used to achieve a desired accelerating effect are actually determined by the weight of the chlorine content rather than of the chloride compound. While this should be taken into account when substituting one chloride for another in a particular formulation, it is unimportant in defining the scope of the invention in view of the wide range of chloride accelerator contents contemplated as explained above.

As to the relative proportions of Components 1 and 3, it will be seen from the following specific examples that the combined weights of these components in the mixes are at least about .45% by weight of the cement.

Our preferred or optimum amounts by weight based on the weight of hydraulic cement, compared to the optimum amounts disclosed in the above mentioned Scripture patent, are as follows:

TABLE II

|  | Percent by Weight | |
|---|---|---|
|  | Present Invention | Scripture Patent |
| Component 1 | .30 | .11 |
| Component 2 | .20 | .09 |
| Component 3 | .20 | .08 |
| Component 4 | .05 | ---------- |
| Totals | .75 | .28 |

Obviously, the above differences in the useful ranges and optimum amounts of Components 1, 2, and 3 can only be attributed to the conjoint effect of Component 4 which is combined therewith in accordance with the present invention.

As is true of the other three components, the fourth component of our additive compositions has also been used heretofore as an hydraulic cement additive. According to U.S. Patent No. 2,031,621, also granted to George R. Tucker, the addition of various amine compounds to a plain mix of cement, water, and aggregates produces practically no change in consistency (i.e., slump and workability), but functions as an accelerator and to increase the final strength of the hardened concrete. This accelerating and strength imparting effect of triethanolamine, for example, has been confirmed by other authorities, with the observation that the accelerating effect is less than that obtained with calcium chloride. Beyond this, little authoritative or helpful information has been published as to the effect of amine compounds on hydraulic cement mixes.

How the incorporation of our fourth amine component increases the strength imparting properties of the other three components to the degree that it does, and how it extends the useful quantity range for the other three ingredients are not yet understood and are not explainable by anything heretofore known about the effects of various amines on hydraulic cement mixes.

To illustrate the effects of the four component additives of the invention on the compressive strengths of concrete mixes at 1, 7, and 28 days, the following Examples 1 to 6 are given in which the proportions and total amounts of the four components were varied.

Each sample compares a plain mix of cement, sand, and coarse aggregate with the same mix containing the additive, both being mixed at the same time from the same basic ingredients with sufficient water to give substantially the same slump (as closely as it is practical to predict the slump from the consistency during mixing).

In the examples, the amounts of total additive and of each of its four components are given in terms of percent by weight of the cement in the final mix. The slump is given in inches (to the nearest half-inch), the cement factor in sacks (94 lbs.) per yard, the amount of water in gallons per sack, the amount of air entrained in the mix in percent by volume, and the average compressive strengths, in pounds per square inch, for a number of test cylinders at each age tested. These figures are shown in tabular form.

Because of the possibility of uncontrollable differences in temperature and humidity, and because of minor variations in lots of cement, sand, and aggregates used in the examples run at different times, it is to be noted that the data for any one example may be only roughly comparable with the data for any of the other examples.

The waste sulfite liquor solids ("Component 1— W.S.L.") used in all of the examples herein were the dried residue from neutralized waste sulfite liquor from which fermentable sugars had been removed. The chloride accelerator ("Component 2—CaCl₂") was calcium chloride. The formaldehyde-aromatic sulfonic acid condensation product ("Component 3—cond. prod.") was the sodium salt of the product of condensation of formaldehyde with naphthalene sulfonic acid, the particular condensation product utilized being sold under the proprietary name "Tamol N" by Rohm & Haas Company of Philadelphia, Pennsylvania. The amine ("Component 4—amine") was commercial triethanolamine. These four components are identified in the examples by the component numbers and abbreviated terms given in parentheses above.

Example 1

In this example, three mixes are compared, one a plain mix (no additive) designated "A," and the other two, designated "B" and "C," containing the four components of the invention in slightly different amounts and proportions approximating our preferred combinations.

|  | (A) Plain Mix | (B) | (C) |
|---|---|---|---|
| Total Additive | -------- | .70 | .75 |
| Component 1—W.S.L. | -------- | .25 | .30 |
| Component 2—CaCl₂ | -------- | .20 | .20 |
| Component 3—cond. prod. | -------- | .20 | .20 |
| Component 4—amine | -------- | .05 | .05 |
| Slump | 3½ | 4.0 | 4.0 |
| Cement factor | 4.98 | 5.02 | 5.05 |
| Water content | 6.61 | 4.90 | 4.94 |
| Air content | 1.6 | 7.0 | 6.5 |
| 1-day strength | 410 | 710 | 720 |
| 7-day strength | 2,630 | 4,860 | 5,010 |
| 28-day strength | 5,020 | 6,730 | 6,990 |

In the foregoing data, the excellent plasticizing effect of the four component additives is illustrated by the slightly greater slumps obtained in mixes B and C with approximately a 26% reduction in water content compared to plain mix A. The remarkable results, however, are the great increases in strength obtained with mixes B and C, compared to plain mix A, while increasing the amount of entrained air from 1.6% in mix A to 7% in mix B and 6.5% in mix C. These increases were of the order of 75% at 1 day, 85%–90% at 7 days, and 34%–39% at 28 days. Such strength increases at all ages with relatively low air contents would heretofore have been considered an excellent achievement. To obtain them along with high air contents is believed to far surpass anything heretofore considered possible.

Example 2

In this example, four mixes are compared, one a plain mix (no additive) designated "D" and the other three, designated "E," "F," and "G," containing progressively increased total quantities of the four components of the invention, but with variations in their relative proportions.

|  | (D) Plain Mix | (E) | (F) | (G) |
|---|---|---|---|---|
| Total Additive | -------- | 1.00 | 1.20 | 1.30 |
| Component 1—W.S.L. | -------- | .50 | .50 | .50 |
| Component 2—CaCl₂ | -------- | .20 | .30 | .30 |
| Component 3—cond. prod. | -------- | .20 | .30 | .30 |
| Component 4—amine | -------- | .10 | .10 | .20 |
| Slump | 4.0 | 4½ | 5½ | 5 |
| Cement factor | 4.99 | 4.95 | 4.99 | 4.89 |
| Water content | 6.59 | 4.83 | 4.67 | 4.66 |
| Air content | 1.6 | 8.5 | 8.2 | 10.0 |
| 1-day strength | 360 | 140 | 620 | 60 |
| 7-day strength | 2,860 | 3,940 | 4,600 | 2,090 |
| 28-day strength | 5,090 | 5,600 | 6,140 | 5,150 |

Again, the excellent plasticizing effects of the additives are shown by the reductions in water content with varying increases in slump. The remarkable results of these tests are the good 7-day strengths of mixes E and F and increased final strengths of mixes E, F, and G obtained with very great entrained air contents from 8.2% up to as high as 10% by volume, compared to the plain mix having a normal air content of about 1.6%. While mixes E and G showed very low 1-day strengths, whereas mix F inexplicably showed a high 1-day strength, this indicated retarding effect of large quantities of the four-component additive containing relatively large amounts of waste sulfite liquor solids (Component 1) is acceptable for many construction projects where obtaining exceptionally high entrained air contents is more vital than improvement in early strength. In fact, such retarding effect may be used to advantage in very hot weather to permit finishing the surface of concrete pavement before it has set beyond a surface finishing condition.

*Example 3*

In this example, somewhat lower amounts of certain additive components were used than in Example 2, with resultant variations in the relative proportions of the four components, to illustrate how such variations affect the properties of the mixes.

|  | (H) Plain (Mix) | (I) | (J) | (K) |
|---|---|---|---|---|
| Total Additive | | .83 | .85 | 1.00 |
| Component 1—W.S.L. | | .40 | .40 | .40 |
| Component 2—CaCl₂ | | .20 | .20 | .30 |
| Component 3—cond. prod. | | .20 | .20 | .20 |
| Component 4—amine | | .03 | .05 | .10 |
| Slump | 4 | 4½ | 5 | 5 |
| Cement factor | 4.99 | 4.99 | 4.96 | 4.99 |
| Water content | 6.60 | 4.69 | 4.77 | 4.69 |
| Air content | 1.6 | 8.0 | 8.3 | 8.0 |
| 1-day strength | 360 | 310 | 300 | 280 |
| 7-day strength | 2,760 | 4,080 | 4,240 | 4,010 |
| 28-day strength | 5,070 | 6,020 | 6,200 | 5,640 |

By comparing mixes I and J, it will be seen that reduction of the amount of amine (Component 4) below 0.05% is reflected by loss of strength at 7 and 28 days, though excellent strengths compared to plain mix H were still obtained with a very high air content of 8% compared to 1.6% for the plain mix.

By comparing mixes J and K, it will be seen that increasing the amount of amine from 0.05% to 0.10% materially reduced the strength at all ages. To the extent that the strength reduction is evident at 28 days, this effect of large amounts of the amine is apparently not a mere retardation phenomenon.

In all three mixes I, J, and K, the retardation indicated by a decrease in 1-day strength, compared to plain mix H, is partly attributable to the relatively high content of 0.40% waste sulfite liquor solids (Component 1) which was used to obtain the high air contents of 8.0% to 8.3%. In all three mixes, I, J, and K, however, the 7-day and 28-day strengths were outstanding, considering the high entrained air content of each.

*Example 4*

This example is given to illustrate how the optimum amounts of the additive components illustrated by Example 1 may be still further varied to obtain similar results.

|  | (L) Plain Mix | (M) |
|---|---|---|
| Total Additive | | .65 |
| Component 1—W.S.L. | | .20 |
| Component 2—CaCl₂ | | .10 |
| Component 3—cond. pro. | | .30 |
| Component 4—amine | | .05 |
| Slump | 4½ | 5½ |
| Cement factor | 4.98 | 4.97 |
| Water content | 6.66 | 4.86 |
| Air content | 1.5 | 8.0 |
| 1-day strength | 320 | 530 |
| 7-day strength | 2,650 | 4,690 |
| 28-day strength | 5,130 | 6,510 |

Here the relative amounts of Component 1 (W.S.L.) and Component 3 (cond. prod.) were reversed and the amount of Component 2 (CaCl₂) was halved, compared to mix C of Example 1. As will be noted, in spite of a higher entrained air content of 8% by volume compared to 6.5% in mix C of Example 1, the 1, 7, and 28-day strength increases over a plain mix were still outstanding, though not to as great a degree.

*Example 5*

In this example, the same additive mixture as was used in mix B of Example 1 was used and the hardened mix was tested for 28-day flexural strength. The flexural strengths were determined by using a simple beam with center point loading, according to ASTM Specification C293–54T, this result being expressed as modulus of rupture in pounds per square inch.

|  | (N) Plain Mix | (O) |
|---|---|---|
| Total Additive | | .70 |
| Component 1—W.S.L. | | .25 |
| Component 2—CaCl₂ | | .20 |
| Component 3—cond. prod. | | .20 |
| Component 4—amine | | .05 |
| Slump | 4 | 4.5 |
| Cement factor | 4.99 | 5.02 |
| Water content | 6.66 | 4.83 |
| Air content | 1.4 | 7.0 |
| 28-day compressive strength | 4,850 | 6,610 |
| 28-day flexural strength | 820 | 950 |

Flexural strength is particularly important in pavements subjected to heavy loads, such as highway pavements, where uniform foundation support is virtually impossible to attain over successive filled and excavated stretches of pavement. Therefore, with mix O, the 16% increase in final flexural strength (as well as better than 36% increase in final compressive strength) while increasing the entrained air content from 1.4% to 7.0%, compared to plain mix N, is most significant.

*Example 6*

Example 5 was repeated except that the additive of mix C of Example 1 was used and approximately one-sixth less cement was used with the mix containing the four component additive than in the plain mix control.

|  | (P) Plain Mix | (Q) |
|---|---|---|
| Total Additive | | .75 |
| Component 1—W.S.L. | | .30 |
| Component 2—CaCl₂ | | .20 |
| Component 3—cond. prod. | | .20 |
| Component 4—amine | | .05 |
| Slump | 4 | 4.5 |
| Cement factor | 5.98 | 5.04 |
| Water content | 5.57 | 4.81 |
| Air content | 1.5 | 6.9 |
| 28-day compressive strength | 6,340 | 6,550 |
| 28-day flexural strength | 960 | 1,000 |

This data indicates how the invention may be employed to reduce the amount of cement in a cement mix while obtaining a high entrained air content along with a lesser, but nevertheless significant, increase in strength, both compressive and flexural. The results of this last example are comparable with those of Example 5. In this case, the additional cement required to obtain somewhat lower strengths with only 1.5% entrained air in plain mix P, compared to mix Q containing our additive and 6.9% entrained air, indicates the economic value of the invention.

As is well known in the art, there is no close correlation between the time required for a cement to set to a surface finishing condition and its 1-day strength. This is due to variations in the shape as well as the average slope of curves showing the degree of set of a mix plotted against time. For example, one modified mix that is retarded in rate of set during the first 12 hours or so may be accelerated during the succeeding twelve hours so as to show an increased 1-day strength compared to a plain mix. Conversely, another modified mix that is accelerated in rate of set during the first 6 to 12 hours or so may be retarded during the succeeding hours so as to show a decreased 1-day strength compared to the same plain mix. Tests indicative of rate of hardening during the time (generally less than 12 hours) required to reach a surface finishing condition involve measuring the force required to pull standard, smooth, steel pins out of a mix in which they have been embedded to a uniform depth. Such tests are described in the copending application Serial No. 569,678, filed March 6, 1956, now U.S. Patent No. 2,860,060, issued November 11, 1958, in which we are joined with Paul B. Jacox as the inventors.

Using ⅜ inch diameter stainless steel pins embedded to a uniform depth of 5 inches in rectangular specimens prepared from cement mixes of different composition, the force required to pull the pins out of each specimen at intervals during the setting of the cement was plotted on graphs for each specimen to show the rate of setting to the point where the pull reached about 50 pounds. From these curves it was evident that the rate of setting could be varied considerably by varying the relative amounts and proportions of the four components of the additives of the present invention. The rate of setting to a normal finishing condition for highway concrete and well beyond that point was substantially the same as for a plain cement mix containing no additive where the amount of waste sulfite liquor component (Component 1) was about .2% by weight based on the weight of the cement. Where the amount of waste sulfite liquor was raised to about .3%, only a very slight retarding action was evident. With higher amounts of waste sulfite liquor, the retarding action became somewhat more pronounced. By increasing the amount of calcium chloride component in the additive, this retardation can be largely controlled with waste sulfite liquor quantities up to around .5% by weight. For this purpose, within the normal range of quantities of waste sulfite liquor solids, from about .10% to about .30% of chloride accelerator will generally be desired.

Variations in the quantity of the condensation product of formaldehyde and an aromatic sulfonic acid (Component 3) had a lesser retarding effect on the rate of set and required smaller adjustments in the amount of chloride accelerator to compensate for such retardation.

Variations in the amount of the amine (Component 4) within the range of amounts contemplated herein appeared to have little retarding or accelerating effect, although variations in either direction from the optimum amount of about .05% by weight based on the weight of cement caused some reduction in strength at all ages as indicated by the foregoing examples.

The foregoing generalizations regarding the effects of the four components on the rate of setting of cement mixes may be used as a guide in selecting formulations which are suitable for a particular construction job, work schedule, and the prevailing weather conditions. Considerable acceleration can be achieved by substantial increases in the amount of chloride accelerator (Component 2) where required, for example, to permit early surface finishing or to counteract the retarding effect of unusually low prevailing temperatures. Considerable retardation may be achieved where desired to counteract the accelerating effect of unusually high prevailing temperatures by increasing the amount of waste sulfite liquor (Component 1) and by decreasing the amount of chloride accelerator.

The presently preferred manner of using the invention is to mix the normally liquid amine component with the dry chloride accelerator in powder form, then mix in the waste sulfite liquor solids and the solid formaldehyde-aromatic sulfonic acid condensation product as dry powders to form the four-component additive as a dry powder. This dry additive, with or without any other additives, may then be incorporated in the cement mix in any of the ways mentioned above which may be most convenient. However, the four components of the additives of the invention may, if desired, be incorporated separately into a cement mix, liquid components being most advantageously incorporated in the gage water before it is added to the dry components of the mix.

When calcium chloride and a normally liquid alkyl amine are mixed together, they tend to combine chemically to form a calcium chloride alkyl amine in the nature of a water-soluble amine addition product. When such a chemical compound or complex of an amine and a chloride is dissolved in the water of a cement mix, it appears to function the same as when its two constituent parts are separately added to the mix. Thus, the chloride and amine components of the four-component additives contemplated by the invention may be parts of a single chemical compound or complex, and actually are so combined when the total additive is prepared as described above.

Where the four components of the invention are mixed together, by the above-described procedure or otherwise, for subsequent incorporation in an hydraulic cement mix, the four-component admixture is suitable for separate packaging and sale for this purpose. In such case, the proportions of the four components may be varied within the following approximate range.

TABLE III

|  | Parts by Weight |
|---|---|
| Component 1 | 20 to 50 |
| Component 2 | 2 to 30 |
| Component 3 | 15 to 30 |
| Component 4 | 3 to 20 |
| Totals | 40 to 130 |

For most highway construction and similar uses, the preferred range and optimum proportions are as follows:

TABLE IV

|  | Parts by Weight | |
|---|---|---|
|  | Preferred Range | Optimum Proportions |
| Component 1 | 25 to 35 | 6 |
| Component 2 | 15 to 25 | 4 |
| Component 3 | 15 to 25 | 4 |
| Component 4 | 3 to 10 | 1 |
| Totals | 58 to 95 | 15 |

Regarding the proportions of Components 1 and 3 in Tables III and IV, it will be seen that, in the above specific Examples 1 to 6 inclusive, the combined amounts of Components 1 and 3, are at least about 45 parts by weight.

Depending to some extent upon variations in hydraulic cements from different manufacturing sources, particularly sand and coarse aggregate proportions, cement factors, strength requirements and other variables, the total amount of any of the foregoing admixtures incorporated in a cement mix may be varied from about ½ to 1 pound per sack (94 lbs.) of cement employed, or substantially .5% to 1% by weight of the cement. Generally, as indicated by the preferred percent by weight of each of the four components given in Table II, above, about 0.75 pound of the admixture per sack of cement will give optimum results when using the optimum proportions of Tables II and IV.

Both in the foregoing disclosure and in the appended claims, if the context is not expressly to the contrary, it is to be understood that all quantities of cement mix ingredients are expressed in terms of parts by weight or percent by weight, and that amounts of entrained air are expressed in terms of percent by volume of the entire mix.

In the foregoing description of the invention, and in the appended claims, reference is made to water-solubility. In the case of the additive components of the invention, this has reference to solubility of the small quantities of such components that are used in a mix in the amount of water contained in the mix.

While the foregoing description of the invention and its various advantages refers to the use of a particular combination of four additive components in mixes of cement, aggregate, and water, it is to be understood that still other additives may be included in cement mixes prepared in accordance with the invention for the purposes for which they are normally employed. Such other additives, for example, may be air-entraining agents, air-detraining agents, pozzuolanic materials, fly ash, coloring materials, water-repellents, and the like, as well as additional chloride accelerator where this is desired to meet special construction problems or to counteract the effects of low atmospheric temperatures.

The four-component additives of the invention may be added alone or mixed and added with such other additives, either to the cement, to the aggregate, or to the water, or they may be incorporated in the completed cement mix, alone or simultaneously with other additives, or in any other desired manner.

In view of the above, it is to be understood that the expression "consisting essentially of" as used in the appended claims in defining the combination of additives on which this invention is based, or in defining a cement mix containing the four components of the combination, does not preclude the presence of other additives for producing their known individual effects, which may be different from and independent of the effects resulting from use of the invention, or may be similar and additive in character, or may in some measure detract from the benefits of the invention.

While the invention has been described and illustrated herein by references to various specific materials, procedures, and examples, it is to be understood that the invention is not restricted to the particular materials, combinations of materials, and procedures selected for that purpose. Numerous variations of such details can be employed, as will be appreciated by those skilled in the art.

Having described our invention, we claim:

1. An additive for hydraulic cement mixes consisting essentially of a mixture of from 20 to 50 parts by weight of waste sulfite liquor solids, from 2 to 30 parts by weight of a water-soluble chloride accelerator, from 15 to 30 parts by weight of a member of the class consisting of water-soluble aldehyde-aromatic sulfonic acid condensation products and water-soluble salts thereof, and 3 to 20 parts by weight of a member of the class consisting of water-soluble alkyl amines and their water-soluble mineral acid addition products; the combined weights of said waste sulfite liquor solids and said aldehyde-sulfonic acid material being at least about 45 parts by weight.

2. An additive for hydraulic cement mixes consisting essentially of a mixture of from 20 to 50 parts by weight of waste sulfite liquor solids, from 2 to 30 parts by weight of a water-soluble chloride accelerator, from 15 to 30 parts by weight of a water-soluble alkali metal salt of a formaldehyde-aromatic sulfonic acid condensation product, and 3 to 20 parts by weight of a member of the class consisting of water-soluble alkyl amines and their water-soluble mineral acid addition products; the combined weights of said waste sulfite liquor solids and said aldehyde-sulfonic acid material being at least about 45 parts by weight.

3. An additive for hydraulic cement mixes consisting essentially of a mixture of from 20 to 50 parts by weight of waste sulfite liquor solids, from 10 to 30 parts by weight of a water-soluble chloride accelerator, from 15 to 30 parts by weight of a water-soluble alkali metal salt of the condensation product of formaldehyde and naphthalene sulfonic acid, and 3 to 10 parts by weight of triethanolamine; the combined weights of said waste sulfite liquor solids and said aldehyde-sulfonic acid material being at least about 45 parts by weight.

4. An additive for hydraulic cement mixes consisting essentially of a mixture of from 25 to 35 parts by weight of waste sulfite liquor solids, from 15 to 25 parts by weight of a water-soluble chloride accelerator, from 15 to 25 parts by weight of a member of the class consisting of water-soluble aldehyde-aromatic sulfonic acid condensation products and water-soluble salts thereof, and 3 to 10 parts by weight of a member of the class consisting of water-soluble alkyl amines and their water-soluble mineral acid addition products; the combined weights of said waste sulfite liquor solids and said aldehyde-sulfonic acid material being at least about 45 parts by weight.

5. An additive for hydraulic cement mixes consisting essentially of a mixture of from 25 to 35 parts by weight of waste sulfite liquor solids, from 15 to 25 parts by weight of a water-soluble chloride accelerator, from 15 to 25 parts by weight of a water-soluble alkali metal salt of a formaldehyde-aromatic sulfonic acid condensation product, and 3 to 10 parts by weight of a member of the class consisting of water-soluble alkyl amines and their water-soluble mineral acid addition products; the combined weights of said waste sulfite liquor solids and said aldehyde-sulfonic acid material being at least about 45 parts by weight.

6. An additive for hydraulic cement mixes consisting essentially of a mixture of from 25 to 35 parts by weight of waste sulfite liquor solids, from 15 to 25 parts by weight of a water-soluble chloride accelerator, from 15 to 25 parts by weight of a water-soluble alkali metal salt of the condensation product of formaldehyde and naphthalene sulfonic acid and 3 to 10 parts by weight of triethanolamine; the combined weights of said waste sulfite liquor solids and said aldehyde-sulfonic acid material being at least about 45 parts by weight.

7. An additive for hydraulic cement mixes consisting essentially of a mixture of from 25 to 35 parts by weight of waste sulfite liquor solids from which the fermentable sugars have been removed, from 15 to 25 parts by weight of calcium chloride, from 15 to 25 parts by weight of a water-soluble alkali metal salt of the condensation product of formaldehyde and naphthalene sulfonic acid, and 3 to 10 parts by weight of triethanolamine; the combined weights of said waste sulfite liquor solids and said aldehyde-sulfonic acid material being at least about 45 parts by weight.

8. A hydraulic cement mix consisting essentially of Portland cement, aggregate, sufficient water to effect hydraulic setting of the cement and produce a workably plastic mix, from .20% to .50% by weight of the cement of waste sulfite liquor solids, from .02% to .30% by weight of the cement of a water-soluble chloride accelerator, from .15% to .30% by weight of the cement of a member of the class consisting of formaldehyde-aromatic sulfonic acid condensation products and water-soluble salts thereof, and .03% to .20% by weight of the cement of a member of the class consisting of water-soluble alkyl amines and their water-soluble mineral acid addition products; the combined weights of said waste sulfite liquor solids and said aldehyde-sulfonic acid material being at least about .45% by weight.

9. A hydraulic cement mix consisting essentially of Portland cement, aggregate, sufficient water to effect hydraulic setting of the cement and produce a workably plastic mix, from .5% to 1% by weight of the cement of an additive according to claim 4.

10. A hydraulic cement mix consisting essentially of Portland cement, aggregate, sufficient water to effect hydraulic setting of the cement and produce a workably plastic mix, from .5% to 1% by weight of the cement of an additive according to claim 7.

11. A hydraulic cement mix consisting essentially of Portland cement, aggregate, sufficient water to effect hydraulic setting of the cement and produce a workably plastic mix, about .75% by weight of the cement of an additive according to claim 7.

12. A hydraulic cement mix consisting essentially of Portland cement, aggregate, sufficient water to effect hydraulic setting of the cement and produce a workably plastic mix, from .25% to .5% by weight of the cement of waste sulfite liquor solids, from .15% to .25% by weight of the cement of a water-soluble chloride accelerator, from .15% to .25% by weight of the cement of a member of the class consisting of formaldehyde-aromatic sulfonic acid condensation products and water-soluble salts thereof, and .03% to .1% by weight of the cement of a member of the class consisting of water-soluble alkyl amines and their water-soluble mineral acid addition products; the combined weights of said waste sulfite liquor solids and said aldehyde-sulfonic acid material being at least about .45% by weight.

13. A hydraulic cement mix consisting essentially of Portland cement, aggregate, sufficient water to effect hydraulic setting of the cement and produce a workably plastic mix, from .25% to .35% by weight of the cement of waste sulfite liquor solids from which the fermentable sugars have been removed, from .15% to .25% by weight of the cement of calcium chloride, from .15% to .25% by weight of the cement of an alkali metal salt of the condensation product of formaldehyde and naphthalene sulfonic acid, and from .03% to .10% by weight of the cement of triethanolamine; the combined weights of said waste sulfite liquor solids and said aldehyde-sulfonic acid material being at least about .45% by weight.

References Cited in the file of this patent

UNITED STATES PATENTS

| | | |
|---|---|---|
| 2,031,621 | Tucker et al. | Feb. 25, 1936 |
| 2,437,842 | Uhler | Mar. 16, 1948 |
| 2,690,975 | Scripture | Oct. 5, 1954 |